(12) United States Patent
Forati

(10) Patent No.: US 10,942,259 B2
(45) Date of Patent: Mar. 9, 2021

(54) LIGHT SCANNING SENSOR CAPABLE OF STEERING BOTH TRANSMIT AND RECEIVE SIGNALS

(71) Applicant: TDK Corporation, Tokyo (JP)

(72) Inventor: Ebrahim Forati, San Jose, CA (US)

(73) Assignee: TDK Corporation, Tokyo (JP)

( * ) Notice: Subject to any disclaimer, the term of this patent is extended or adjusted under 35 U.S.C. 154(b) by 347 days.

(21) Appl. No.: 15/964,957

(22) Filed: Apr. 27, 2018

(65) Prior Publication Data

US 2019/0331770 A1 Oct. 31, 2019

(51) Int. Cl.
*G01S 7/48* (2006.01)
*G01S 7/481* (2006.01)
*G01S 7/484* (2006.01)
*G01S 17/42* (2006.01)

(52) U.S. Cl.
CPC ............ *G01S 7/4817* (2013.01); *G01S 7/484* (2013.01); *G01S 17/42* (2013.01)

(58) Field of Classification Search
CPC ... A61B 5/0068; A61B 3/1025; A61B 5/0075; A61B 5/0097; G01J 3/4412
See application file for complete search history.

(56) References Cited

U.S. PATENT DOCUMENTS

| | | | | |
|---|---|---|---|---|
| 6,002,480 A | * | 12/1999 | Izatt | G01J 3/4412 356/479 |
| 2006/0244973 A1 | * | 11/2006 | Yun | G01B 9/02091 356/511 |
| 2012/0302862 A1 | * | 11/2012 | Yun | A61B 5/0068 600/398 |

* cited by examiner

*Primary Examiner* — Luke D Ratcliffe

(74) *Attorney, Agent, or Firm* — Hamilton, Brook, Smith & Reynolds, P.C.

(57) ABSTRACT

A technique that can maximize signal to noise ratio in systems that use beam steering, by steering both the transmit and receive signals. A beam splitter is used, which is positioned to receive both the light beam transmitted by the light source and the return light beam, and a scanning beam steerer, which is positioned to receive both transmitted light from the beam splitter and returning light from the target. Using a split portion of the beam, a reference signal can be provided to probe the ambient condition of the sensor, to sense conditions such as darkness and fog.

15 Claims, 3 Drawing Sheets

LIGHT SCANNING SENSOR CAPABLE OF STEERING BOTH TRANSMIT AND RECEIVE SIGNALS

BACKGROUND

Beam steering is a challenge in the design of many sensing, imaging, projection and other devices involving light beams. Commercial applications of beam steering include, for example, projection displays, laser printers and Lidar sensors. Usually the transmit beam is steered, and a detector array, with wide angle optics, is used to detect reflections.

There is, however, an ongoing need to improve the signal to noise ratio in systems that use beam steering.

SUMMARY

In accordance with an embodiment of the invention, there is provided a technique that can maximize signal to noise ratio in systems that use beam steering, by steering both the transmit and receive signals. A beam splitter is used, which is positioned to receive both the light beam transmitted by the light source and the return light beam, and a scanning beam steerer, which is positioned to receive both transmitted light from the beam splitter and returning light from the target. Using a split portion of the beam, a reference signal can be provided to probe the ambient condition of the sensor, to sense conditions such as darkness and fog.

In one embodiment according to the invention, there is provided a light scanning sensor. The light scanning sensor comprises a light transmitter source. A scanning beam steerer is positioned to receive at least a portion of a light beam transmitted by the light transmitter source, and is positioned to receive a return light beam of at least one target object of the light sensor. A light detector is positioned to receive at least a portion of the return light beam.

In further, related embodiments, the light scanning sensor may further comprise a beam splitter positioned to receive the light beam transmitted by the light transmitter source. The scanning beam steerer may be positioned to receive a split portion of the light beam transmitted by the light transmitter source, the split portion having been split by the beam splitter from the light beam transmitted by the light transmitter source. The beam splitter may be further positioned to receive the return light beam upon the return light beam having been reflected by the scanning beam steerer. The light detector may be further positioned to receive the at least a portion of the return light beam upon its having been at least partially reflected by the beam splitter. The scanning beam steerer may comprise a microelectromechanical system mirror positioned to receive both the split portion of the light beam transmitted by the light transmitter source and the return light beam of the at least one target object of the light sensor. The light scanning sensor may further comprise an optical assembly comprising at least one collimating lens, the optical assembly positioned in at least one optical path of light transmitted to or from the beam splitter.

In other related embodiments, the light scanning sensor may further comprise an ambient condition enclosure positioned to receive an ambient reference split portion of the light beam transmitted by the light transmitter source, the ambient reference split portion having been split by the beam splitter from the light beam transmitted by the light transmitter source. A reference reflector may be positioned on at least a portion of the ambient condition enclosure, the reference reflector being positioned to receive the ambient reference split portion of the light beam upon the ambient reference split portion having passed through at least a portion of the ambient condition enclosure. The reference reflector may be configured to reflect at least a portion of the ambient reference split portion of the light beam. The beam splitter may be further positioned to receive the ambient reference split portion of the light beam upon the ambient reference split portion having been reflected by the reference reflector. The light detector may be further positioned to receive at least a portion of the ambient reference split portion upon the ambient reference split portion having been transmitted through the beam splitter. The ambient condition enclosure may be at least one of: (i) transparent to light from ambient surroundings of the light scanning sensor, and (ii) open to an ambient environment of the light scanning sensor.

In further related embodiments, the light scanning sensor may further comprise a light detector read out circuit in operative connection with the light detector. The light detector read out circuit may comprise a received signal output circuit comprising: (i) a first received signal electrical output corresponding to the ambient reference split portion of the light beam and (ii) a second received signal electrical output corresponding to the return light beam of the at least one target object. The light scanning sensor may further comprise a demodulation circuit in operative connection with the light detector read out circuit. The demodulation circuit may be configured to demodulate at least a portion of the return light beam. The light scanning sensor may further comprise a pulse detector in operative connection with the light detector read out circuit. The pulse detector may be configured to detect pulses in at least a portion of the return light beam. The first received signal electrical output may comprise at least one first electrical timing signal determined based on timing of receipt of the ambient reference split portion of the light beam, and the second received signal electrical output may comprise at least one second electrical timing signal determined based on timing of receipt of the return light beam of the at least one target object.

In other related embodiments, the light transmitter source may comprise a laser diode. The light scanning sensor may further comprise a laser driver circuit in operative connection with the light transmitter source. The laser driver circuit may be configured to drive the laser diode. The light scanning sensor may further comprise a modulation circuit in operative connection with the laser driver circuit. The modulation circuit may be configured to modulate the light beam transmitted by the light transmitter source. The light scanning sensor may further comprise a pulse generator circuit in operative connection with the laser driver circuit. The pulse generator circuit may be configured to pulse the light beam transmitted by the light transmitter source. The light scanning sensor may comprise a Lidar sensor, including a time of flight Lidar sensor or a coherent Lidar sensor. The scanning beam steerer may comprise a mirror mounted to scan in two dimensions to produce a three-dimensional light scan of the at least one target object of the light sensor.

In another embodiment according to the invention, there is provided a method of sensing light. The method comprises transmitting a light beam from a light transmitter source; receiving at least a portion of the light beam transmitted by the light transmitter source using a scanning beam steerer; receiving a return light beam of at least one target object of the light sensor, using the scanning beam steerer; and receiving, with a light detector, at least a portion of the return light beam, upon the return light beam having been received with the scanning beam steerer.

In further, related embodiments, the method may further comprise splitting the light beam, transmitted by the light transmitter source, using a beam splitter. The receiving the at least a portion of the light beam transmitted by the light transmitter source using the scanning beam steerer may comprise, with the scanning beam steerer, receiving a split portion of the light beam, the split portion having been split by the beam splitter from the light beam transmitted by the light transmitter source. The method may further comprise scanning the split portion of the light beam over at least one target object with the scanning beam steerer; and reflecting the return light beam, with the scanning beam steerer, to the beam splitter. The receiving with the light detector may comprise detecting at least a portion of the return light beam having been at least partially reflected by the beam splitter. The scanning beam steerer may comprise a microelectromechanical system mirror, the method further comprising receiving both the split portion of the light beam transmitted by the light transmitter source and the return light beam of the at least one target object of the light sensor using the microelectromechanical system mirror. The method may further comprise passing light transmitted to or from the beam splitter through an optical assembly comprising at least one collimating lens.

In other related embodiments, the scanning beam steerer may comprise a mirror mounted to scan in two dimensions, and the scanning the split portion of the light beam over the at least one target object with the scanning beam steerer may comprise scanning the split portion of the light beam over the at least one target object in two dimensions to produce a three-dimensional light scan of the at least one target object. The method may further comprise splitting, from the light beam transmitted by the light transmitter source, an ambient reference split portion of the light beam transmitted by the light transmitter source. The ambient reference split portion of the light beam may be passed through at least a portion of an ambient condition enclosure. The method may comprise reflecting the ambient reference split portion of the light beam, using a reference reflector positioned on at least a portion of the ambient condition enclosure, to be received by the beam splitter; and receiving, with the light detector, at least a portion of the ambient reference split portion of the light beam, upon the at least a portion of the ambient reference split portion of the light beam having been transmitted through the beam splitter. The ambient condition enclosure may be at least one of: (i) transparent to light from ambient surroundings of the light scanning sensor, and (ii) open to an ambient environment of the light scanning sensor.

In further related embodiments, the method may further comprise using a light detector read out circuit to determine (i) a first received signal electrical output corresponding to the ambient reference split portion of the light beam and (ii) a second received signal electrical output corresponding to the return light beam of the at least one target object. The method may further comprise: modulating the light beam transmitted by the light transmitter source; and demodulating the at least a portion of the return light beam received by the light detector. The method may further comprise: pulsing the light beam transmitted by the light transmitter source; and using a pulse detector to detect pulses in at least a portion of the return light beam received by the light detector. The light transmitter source may comprise a laser diode.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

In accordance with an embodiment of the invention, there is provided a technique that can maximize signal to noise ratio in systems that use beam steering, by steering both the transmit and receive signals. A beam splitter is used, which is positioned to receive both the light beam transmitted by the light source and the return light beam, and a scanning beam steerer, which is positioned to receive both transmitted light from the beam splitter and returning light from the target. Using a split portion of the beam, a reference signal can be provided to probe the ambient condition of the sensor, to sense conditions such as darkness and fog.

Figure 1:
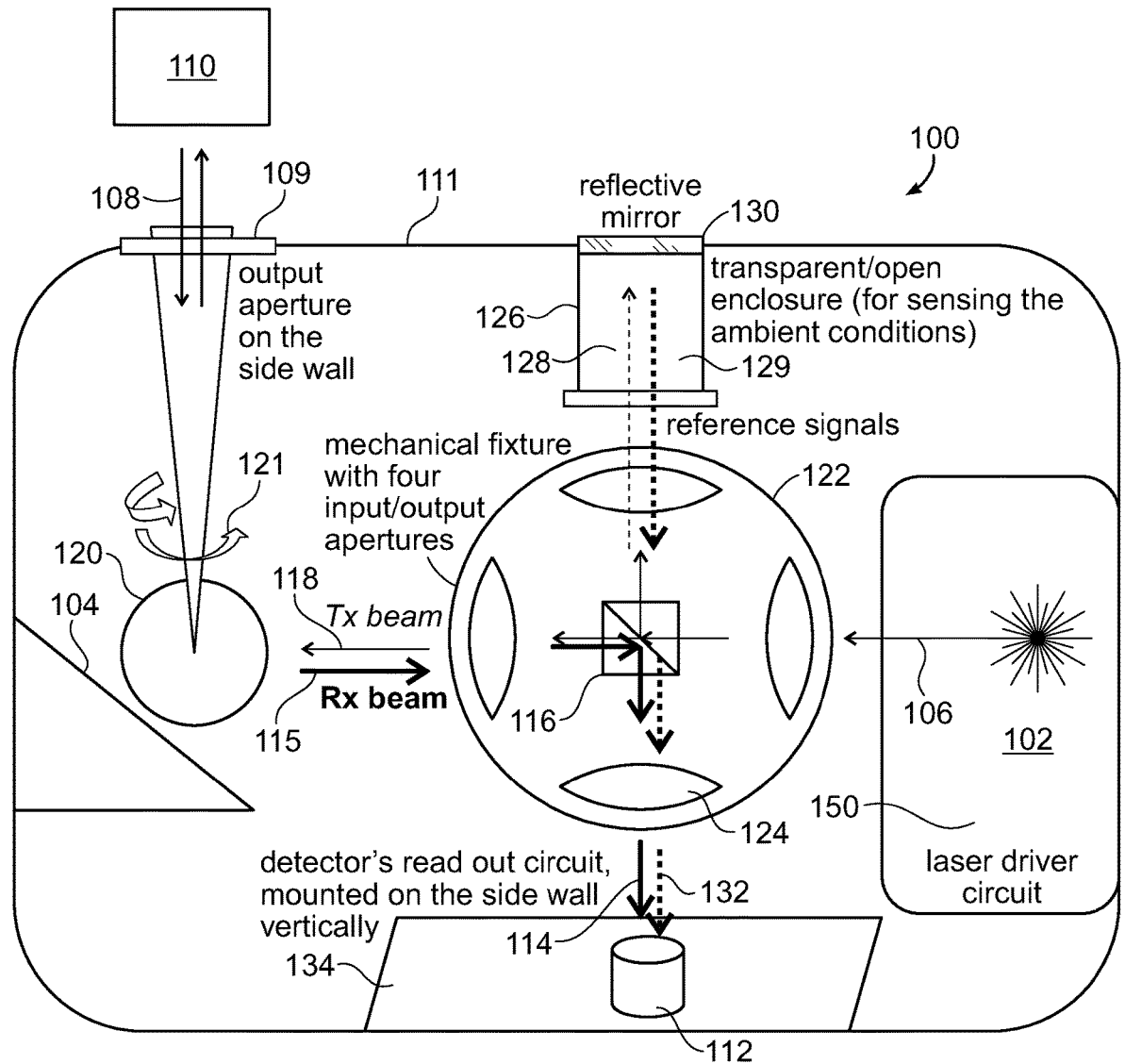
FIG. 1 is a schematic diagram of a light scanning sensor system in accordance with an embodiment of the invention.

FIG. 1 is a schematic diagram of a light scanning sensor system 100 in accordance with an embodiment of the invention. The light scanning sensor 100 comprises a light transmitter source 102. A scanning beam steerer 104 is positioned to receive at least a portion of a light beam 106 transmitted by the light transmitter source 102, and is also positioned to receive a return light beam 108 of at least one target object 110 of the light sensor. The transmitted light beam 106 can leave the light scanning sensor 100, and the return light beam 108 can enter the light scanning sensor 100, through an output aperture 109 on the side wall of an enclosure 111 of the system 100. A light detector 112 is positioned to receive at least a portion 114 of the return light beam 108. The light scanning sensor 100 includes a beam splitter 116 positioned to receive the light beam 106 transmitted by the light transmitter source 102. The scanning beam steerer 104 is positioned to receive a split portion 118 of the light beam 106 transmitted by the light transmitter source 102, which has been split by the beam splitter 116 from the light beam 106 transmitted by the light transmitter source 102. The beam splitter 116 is also positioned to receive at least a portion 115 of the return light beam 108 upon the return light beam 108 having been reflected by the scanning beam steerer 104. The light detector 112 is also positioned to receive the at least a portion 114 of the return light beam 108 upon its having been at least partially reflected by the beam splitter 116. The scanning beam steerer 104 can, for example, include a microelectromechanical system mirror 120 (indicated schematically in FIG. 1), positioned to receive both the split portion 118 of the light beam 106 transmitted by the light transmitter source 102 and the return light beam 108 of the at least one target object 110 of the light sensor 100. The scanning beam steerer 104 can, for example, be a mirror 120 mounted to scan in two dimensions 121 to produce a three-dimensional light scan of the target object 110. The light scanning sensor 100 also includes an optical assembly 122, positioned in the optical path of light transmitted to or from the beam splitter 116. The optical assembly 122 can, for example, include one or more optical components, such as one or more collimating lenses 124, which may, for example, be concave or convex lenses. The optical assembly 122 can, for example, be a mechanical fixture, such as a cylindrical enclosure, with two, four or another number of input/output apertures, although it will be appreciated that any number of apertures and a variety of different possible mechanical fixtures can be used.

In addition, in the embodiment of FIG. 1, the light scanning sensor 100 includes an ambient condition enclosure 126, which is positioned to receive an ambient reference split portion 128 of the light beam 106 transmitted by the light transmitter source 102, which was split by the beam splitter 116 from the light beam 106 that was transmitted by the light transmitter source 102. A reference reflector 130, such as a reflective mirror, may be positioned on at least a portion of the ambient condition enclosure 126, and be positioned to receive the ambient reference split portion 128 of the light beam 106, after the ambient reference split portion 128 has passed through at least part of the ambient condition enclosure 126. The beam splitter 116 is positioned to receive, as indicated at 129, the ambient reference split portion 128 of the light beam once the ambient reference split portion 128 has been reflected by the reference reflector 130. The light detector 112 is positioned to receive at least a portion 132 of the ambient reference split portion 128 after the ambient reference split portion 128 has been transmitted through the beam splitter 116. The ambient condition enclosure 126 can, for example, be transparent to light from the ambient surroundings of the light scanning sensor 100, or open to an ambient environment of the light scanning sensor 100. In this way, the ambient reference split portion 128 of the light beam 106 is used to probe the ambient conditions of the sensor 100 by passing through at least part of the ambient condition enclosure 126. Ambient conditions such as, for example, darkness and fog, can be probed and adjusted for by the light sensor, such as a Lidar sensor. Noise level, biases and other factors of systems, such as Lidar sensors, can be adjusted based on the detected ambient conditions. In one embodiment, the light detector 112 and associated circuitry 134 (described further below) can be mounted on the side wall of the enclosure 111, with the circuitry being mounted vertically on the side wall. The enclosure 111 can, for example, be of a size of between about 10 cm and 15 cm in largest dimension, or smaller, although a variety of different possible dimensions may be used. The circuitry 134, 150 (described below) for both the light detector 112 and the light source 102 respectively can, for example, be implemented as a printed circuit board, or other circuit fabrication technique, which can be mounted to the interior wall of the enclosure 111. In addition, other components such as the ambient condition enclosure 126, the light source 102 and its associated circuitry (described below) and the scanning beam steerer 104 can be mounted on the side walls of the enclosure 111. The optical assembly 122 can be mounted centrally in the enclosure 111 to receive and transmit the various light beams from the light transmitter source 102, the scanning beam steerer 104, the ambient condition enclosure 126 and the light detector 112. The beam splitter 116 can be mounted centrally within the optical assembly 122, for example at the intersection of light beams within the optical assembly 122. In one example, the beam splitter 116 is mounted at the intersection of optical paths from each of four lenses in four input/output apertures of the optical assembly 122, although it will be appreciated that a variety of different optical arrangements may be used. Further, it will be appreciated that, as used herein, various light beams are transmitted through and within the optical assembly 122. Thus, for example, the light beam 106 transmitted from the light transmitter source 102 is passed through the optical assembly 122, and through the beam splitter 116, and is reflected off the scanning beam steerer 104. Thus, the various portions of the transmitted beam after passing through those components may be considered as at least a portion of the transmitted light beam 106. Similar considerations apply to the light beams returning from the target 110, and being transmitted to and from the ambient condition enclosure 126 and to the light detector 112.

In another embodiment, the ambient condition enclosure 126 is not used, or not even present, in which case the split portion 128 of the transmitted beam is wasted, and the system is unable to probe ambient conditions, but the complexity and cost of the design is reduced.

Figure 2:
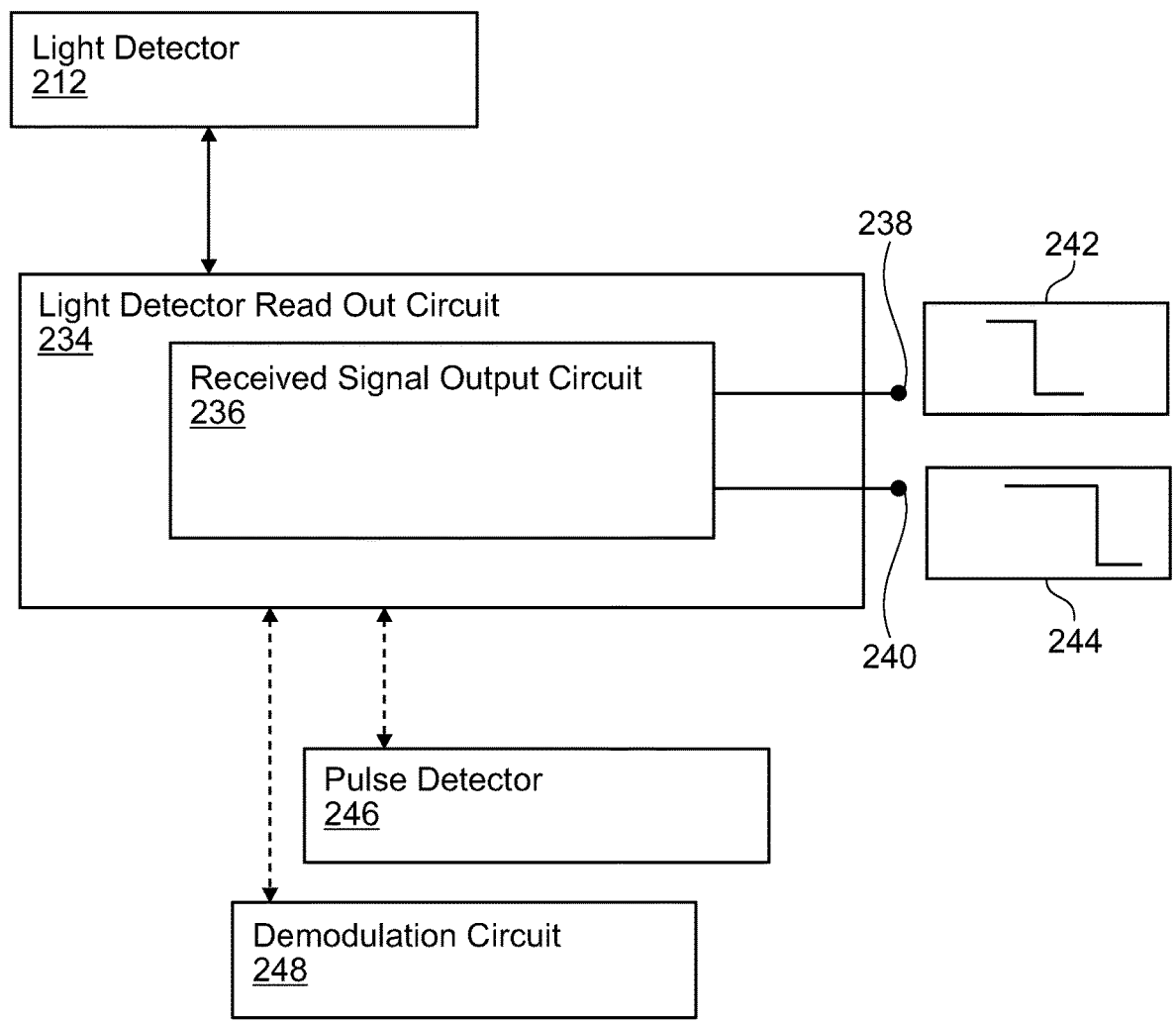
FIG. 2 is a schematic block diagram of circuitry associated with a light detector of a light scanning sensor, in accordance with an embodiment of the invention.

FIG. 2 is a schematic block diagram of circuitry associated with a light detector 212 of a light scanning sensor in accordance with an embodiment of the invention. In FIG. 2, the light scanning sensor includes a light detector read out circuit 234 in operative connection with the light detector 212. The light detector read out circuit 234 includes a received signal output circuit 236, which has a first received signal electrical output 238 that corresponds to the ambient reference split portion 128 (see FIG. 1) of the light beam, and a second received signal electrical output 240 that corresponds to the return light beam 108 (see FIG. 1) from the target object. The first received signal electrical output 238 includes a first electrical timing signal 242, which is determined based on timing of receipt of the ambient reference split portion 128 (see FIG. 1) of the light beam, and the second received signal electrical output includes a second electrical timing signal 244 which is determined based on timing of receipt of the return light beam 108 (see FIG. 1) from the target object. For example, it will typically take a shorter amount of time for the ambient reference split portion 128 (see FIG. 1) to reach the light detector 212 than the amount of time taken by the return light beam 108 (see FIG. 1) from the target object, because the length of the path of light to the target is greater than the length of the path of light to and from the ambient condition enclosure 126 (see FIG. 1). Thus, the difference between the first electrical timing signal 242 and second electrical timing signal 244 can be used to determine which light signals received by the light detector 212 come from the light 108 returning from the target, and which come from the ambient condition enclosure 126 (see FIG. 1). The light scanning sensor 100 (see FIG. 1) can, for example, be a Lidar sensor, including a time of flight Lidar sensor or a coherent Lidar sensor. For a time of flight Lidar sensor, a pulsed laser signal is used from the light transmitter source 102 (see FIG. 1). In such systems, and others in which a pulsed light signal is used, the light scanning sensor can include a pulse detector 246 in operative connection with the light detector read out circuit 234. For a coherent Lidar sensor, a modulated laser signal is used from the light transmitter source 102 (see FIG. 1). In such systems, and others in which a modulated light signal is used, the light scanning sensor can include a demodulation circuit 248 in operative connection with the light detector read out circuit 234.

Figure 3:
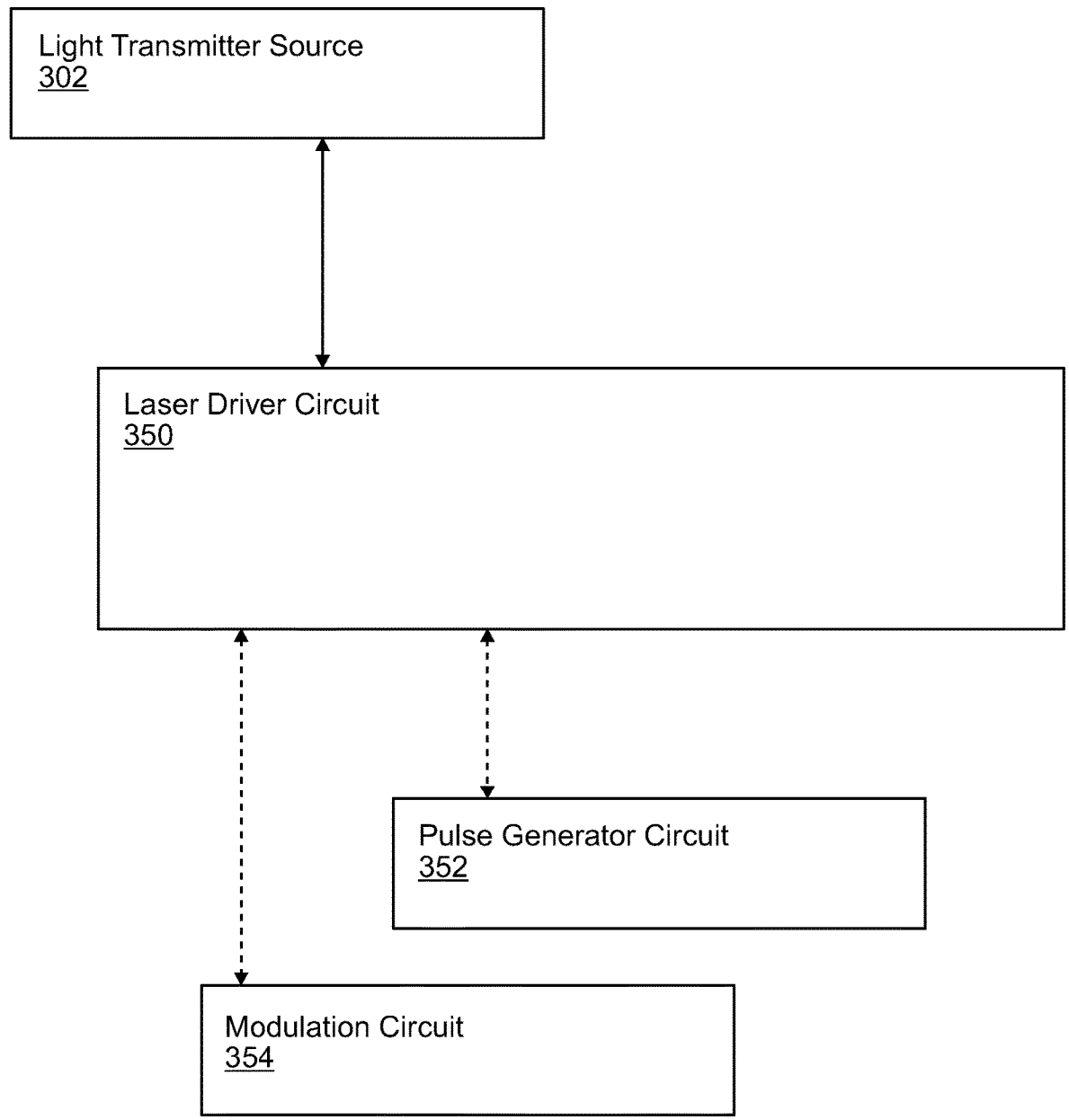
FIG. 3 is a schematic block diagram of circuitry associated with a light transmitter source of a light scanning sensor in accordance with an embodiment of the invention.

FIG. 3 is a schematic block diagram of circuitry associated with a light transmitter source 302 of a light scanning sensor in accordance with an embodiment of the invention. The light transmitter source 302 can, for example, include a laser diode. The light scanning sensor can include a laser driver circuit 350 in operative connection with the light transmitter source 302. The laser driver circuit 350 can, for example, include heat sinks and other components needed for driving the high current of the laser. For a time of flight Lidar sensor, and others in which a pulsed light signal is used, the light scanning sensor can include a pulse generator circuit 352 in operative connection with the laser driver circuit 350. For a coherent Lidar sensor, and others in which a modulated light signal is used, the light scanning sensor can include a modulation circuit 354 in operative connection with the laser driver circuit 350.

In operation of an embodiment according to the invention, with reference to FIG. 1, a method of sensing light includes transmitting the light beam 106 from the light transmitter source 102. At least part of the light beam 106 transmitted by the light transmitter source 102 is received with the scanning beam steerer 104. The return light beam 108 from the target object 110 is received using the scanning beam steerer 104. At least part of the return light beam 108 is received with the light detector 112, after the return light beam 108 has been received with the scanning beam steerer 104. The light beam 106, transmitted by the light transmitter source 102, is split using the beam splitter 116. A split portion 118 of the light beam is received by the scanning beam steerer 104, after the split portion 118 has been split by the beam splitter 116 from the light beam 106 transmitted by the light transmitter source 102. The split portion 118 of the light beam 106 is scanned over the target object 110 with the scanning beam steerer 104; and, in addition, the return light beam 108 is reflected, with the scanning beam steerer 104, to the beam splitter 116. The portion 114 of the return light beam, which has been at least partially reflected by the beam splitter 116, is detected with the light detector 112. Both the split portion 118 of the light beam 106 transmitted by the light transmitter source, and the return light beam 108 from the target object, can be received using the microelectromechanical system mirror 120. The light transmitted to or from the beam splitter 116 can be passed through the optical assembly 122, including the one or more collimating lenses 124. The split portion 118 of the light beam 106 can be scanned over the target object 110 in two dimensions to produce a three-dimensional light scan of the target object 110.

With continuing reference to FIG. 1, in operation of an embodiment according to the invention with an ambient condition enclosure 126, the ambient reference split portion 128 is split from the light beam 106 transmitted by the light transmitter source 102. The ambient reference split portion 128 is passed through at least part of the ambient condition enclosure 126. The ambient reference split portion 128 is reflected using the reference reflector 130, to be received by the beam splitter 116. The light detector 112 receives at least part 132 of the ambient reference split portion 128, once the part 132 of the ambient reference split portion 128 has been transmitted through the beam splitter 116.

With reference to FIGS. 2 and 3, in operation of an embodiment according to the invention, the received signal output circuit 236 of the light detector read out circuit 234 is used to determine the first received signal electrical output 238 corresponding to the ambient reference split portion 128 (see FIG. 1) of the light beam and the second received signal electrical output 240 corresponding to the return light beam 108 (see FIG. 1) from the target object. Where modulation is used, such as with a coherent Lidar sensor, the light beam 106 (see FIG. 1) transmitted by the light transmitter source is modulated using modulation circuit 354 (see FIG. 3); and the at least a portion of the return light beam received by the light detector 212 (see FIG. 2) is demodulated using demodulation circuit 248 (see FIG. 2). Where pulsing is used, such as with a time of flight Lidar sensor, the light beam 106 (see FIG. 1) transmitted by the light transmitter source is pulsed using pulse generator circuit 352 (see FIG. 3); and the pulse detector 246 (see FIG. 2) is used to detect pulses in at least part of the return light beam received by the light detector 212 (see FIG. 2).

Embodiments according to the invention can be used in a variety of different possible applications where beam steering is necessary or advantageous, including, for example, in sensing, imaging and projection devices, such as in projection displays, laser printers and Lidar sensors. In one embodiment, the light sensor is a Microelectromechanical System (MEMS)-based Lidar sensor, for example for automotive application, such as in semi-autonomous and autonomous vehicles. By contrast with previous techniques, in which a transmit beam is steered and wide-angle optics are used to detect reflections, an embodiment according to the invention can maximize (or at least to improve) a signal to noise ratio of the received reflection from target objects, by steering both the transmit and receive signals. In this way, the output power of the light source can be reduced, the range of the light sensor can be increased, and its resolution can be increased. The beam splitter reduces complexity and cost of the system, but it has the potential drawback of reducing the transmitted and received signals by as much as 3 dB. However, the deflected beam in the transmission path is not wasted, when it is used as a reference beam to probe the ambient condition of the sensor, using ambient condition enclosure 126. Furthermore, use of the beam splitter eliminates any potential need that there might otherwise be to use and synchronize two beam steering mechanisms, such as two MEMS mirrors, in the design of a Lidar sensor. An embodiment according to the invention, therefore, provides a simple and low-cost platform for implementing MEMS Lidar sensors. A MEMS mirror, detector, laser and driving circuit can be selected to be used in the system, based on the criteria of the field of use of the sensor.

In accordance with an embodiment of the invention, a microelectromechanical system (MEMS) component, which can also be referred to as a micromachine or a micro systems technology (MST) component, can be made of components between about 1 and 100 micrometers in size, with the entire component being from about 20 micrometers to about 1 millimeter in size. However, it will be appreciated that MEMS components of other sizes can be used, and the components, and overall device, taught herein, can be of different sizes than the specific sizes given.

In accordance with an embodiment of the invention, a "Lidar" system is one that measures distances to a target by illuminating the target with light and measuring the returning light from the target with a sensor. The light may be pulsed or coherent. Based on the returning signal, for example based on differences in laser return times and wavelengths, a representation of the target, such as a three-dimensional digital representation of the target implemented in one or more electronic media, can be made.

In accordance with an embodiment of the invention, a variety of different possible types of beam splitters may be used. For example, a beam splitter may be a cube made of two triangular glass prisms glued together at their base using adhesives, with the thickness of the adhesives being adjusted such that, for a certain wavelength, half of the light incident through one port is reflected and the other half is transmitted due to frustrated total internal reflection. Polarizing beam splitters, using birefringent materials, may also be used. In addition, half-silvered mirrors, a dichroic mirrored prism with dichroic optical coatings, and any other suitable type of beam splitter may be used.

In accordance with an embodiment of the invention, a light transmitter source can include a laser source, such as a laser diode. For example, laser diodes made on a Gallium Arsenide (GaAs) substrate, which can meet Class I eye safety requirements, can be used, although it will be appreciated that a variety of different possible laser diodes and other light transmitter sources can be used.

In accordance with an embodiment of the invention, a light detector can be any suitable light detector for the light source, optical system and field of use. In one embodiment, a silicon-based photodetector, or any other type of photodetector, including an Avalanche Photo Detector (APD), can be used.

While example embodiments have been particularly shown and described, it will be understood by those skilled in the art that various changes in form and details may be made therein without departing from the scope of the embodiments encompassed by the appended claims.

What is claimed is:

1. A light scanning sensor, the light scanning sensor comprising:
   a light transmitter source;
   a scanning beam steerer positioned to receive at least a portion of a light beam transmitted by the light transmitter source, and positioned to receive a return light beam of at least one target object of the light sensor;
   a light detector positioned to receive at least a portion of the return light beam;
   a beam splitter positioned to receive the light beam transmitted by the light transmitter source;
   the scanning beam steerer being positioned to receive a split portion of the light beam transmitted by the light transmitter source, the split portion having been split by the beam splitter from the light beam transmitted by the light transmitter source,
   the beam splitter being further positioned to receive the return light beam upon the return light beam having been reflected by the scanning beam steerer; and
   the light detector being further positioned to receive the at least a portion of the return light beam upon its having been at least partially reflected by the beam splitter;
   the scanning beam steerer comprising a mirror mounted to scan in two dimensions to produce a three-dimensional light scan of the at least one target object of the light sensor.

2. The light scanning sensor of claim 1, wherein the scanning beam steerer comprises a microelectromechanical system mirror positioned to receive both the split portion of the light beam transmitted by the light transmitter source and the return light beam of the at least one target object of the light sensor.

3. The light scanning sensor of claim 1, further comprising:
   an ambient condition enclosure positioned to receive an ambient reference split portion of the light beam transmitted by the light transmitter source, the ambient reference split portion having been split by the beam splitter from the light beam transmitted by the light transmitter source;
   a reference reflector positioned on at least a portion of the ambient condition enclosure, the reference reflector being positioned to receive the ambient reference split portion of the light beam upon the ambient reference split portion having passed through at least a portion of the ambient condition enclosure, the reference reflector being configured to reflect at least a portion of the ambient reference split portion of the light beam;
   the beam splitter being further positioned to receive the ambient reference split portion of the light beam upon the ambient reference split portion having been reflected by the reference reflector; and
   the light detector being further positioned to receive at least a portion of the ambient reference split portion upon the ambient reference split portion having been transmitted through the beam splitter.

4. The light scanning sensor of claim 3, wherein the ambient condition enclosure is at least one of: (i) transparent to light from ambient surroundings of the light scanning sensor, and (ii) open to an ambient environment of the light scanning sensor.

5. The light scanning sensor of claim 3, further comprising a light detector read out circuit in operative connection with the light detector, the light detector read out circuit comprising a received signal output circuit comprising: (i) a first received signal electrical output corresponding to the ambient reference split portion of the light beam and (ii) a second received signal electrical output corresponding to the return light beam of the at least one target object.

6. The light scanning sensor of claim 5, further comprising a demodulation circuit in operative connection with the light detector read out circuit, the demodulation circuit being configured to demodulate at least a portion of the return light beam.

7. The light scanning sensor of claim 5, further comprising a pulse detector in operative connection with the light detector read out circuit, the pulse detector being configured to detect pulses in at least a portion of the return light beam.

8. The light scanning sensor of claim 5, wherein the first received signal electrical output comprises at least one first electrical timing signal determined based on timing of receipt of the ambient reference split portion of the light beam and wherein the second received signal electrical output comprises at least one second electrical timing signal determined based on timing of receipt of the return light beam of the at least one target object.

9. The light scanning sensor of claim 1, wherein the light transmitter source comprises a laser diode.

10. The light scanning sensor of claim 9, further comprising a laser driver circuit in operative connection with the light transmitter source, the laser driver circuit being configured to drive the laser diode.

11. The light scanning sensor of claim 10, further comprising a modulation circuit in operative connection with the laser driver circuit, the modulation circuit being configured to modulate the light beam transmitted by the light transmitter source.

12. The light scanning sensor of claim 10, further comprising a pulse generator circuit in operative connection with the laser driver circuit, the pulse generator circuit being configured to pulse the light beam transmitted by the light transmitter source.

13. A method of sensing light, the method comprising:
   transmitting a light beam from a light transmitter source;
   receiving at least a portion of the light beam transmitted by the light transmitter source using a scanning beam steerer;
   receiving a return light beam of at least one target object of the light sensor, using the scanning beam steerer;
   receiving, with a light detector, at least a portion of the return light beam, upon the return light beam having been received with the scanning beam steerer;
   splitting the light beam, transmitted by the light transmitter source, using a beam splitter;

the receiving the at least a portion of the light beam transmitted by the light transmitter source using the scanning beam steerer comprising, with the scanning beam steerer, receiving a split portion of the light beam, the split portion having been split by the beam splitter from the light beam transmitted by the light transmitter source;

scanning the split portion of the light beam over at least one target object with the scanning beam steerer;

reflecting the return light beam, with the scanning beam steerer, to the beam splitter;

the receiving with the light detector comprising detecting at least a portion of the return light beam having been at least partially reflected by the beam splitter; and the scanning beam steerer comprising a mirror mounted to scan in two dimensions, the scanning the split portion of the light beam over the at least one target object with the scanning beam steerer comprising scanning the split portion of the light beam over the at least one target object in two dimensions to produce a three-dimensional light scan of the at least one target object.

14. The method of claim 13, wherein the scanning beam steerer comprises a microelectromechanical system mirror, the method further comprising receiving both the split portion of the light beam transmitted by the light transmitter source and the return light beam of the at least one target object of the light sensor using the microelectromechanical system mirror.

15. The method of claim 13, further comprising:

splitting, from the light beam transmitted by the light transmitter source, an ambient reference split portion of the light beam transmitted by the light transmitter source;

passing the ambient reference split portion of the light beam through at least a portion of an ambient condition enclosure;

reflecting the ambient reference split portion of the light beam, using a reference reflector positioned on at least a portion of the ambient condition enclosure, to be received by the beam splitter; and receiving, with the light detector, at least a portion of the ambient reference split portion of the light beam, upon the at least a portion of the ambient reference split portion of the light beam having been transmitted through the beam splitter.

* * * * *